(12) United States Patent
Ellä et al.

(10) Patent No.: US 6,751,470 B1
(45) Date of Patent: Jun. 15, 2004

(54) VERSATILE RF FRONT-END MULTIBAND MOBILE TERMINALS

(75) Inventors: Juha Ellä, Halikka (FI); Helena Pohjonen, Espoo (FI)

(73) Assignee: Nokia Corporation, Espoo (FI)

( * ) Notice: Subject to any disclaimer, the term of this patent is extended or adjusted under 35 U.S.C. 154(b) by 73 days.

(21) Appl. No.: 10/118,657

(22) Filed: Apr. 8, 2002

(51) Int. Cl.$^7$ ................................................ H04M 1/00
(52) U.S. Cl. ........................ 455/552; 455/86; 455/267; 455/315; 455/188.1
(58) Field of Search ................ 455/552.1, 86, 455/267, 315, 188.1, 575.1, 561.1, 562.1, 550.1, 130, 132, 190.1, 209, 339, 346, 348, 349, 73, 307, 293; 375/316.334, 150, 344, 347, 131; 332/101, 100, 117; 343/700 R, 702

(56) References Cited

U.S. PATENT DOCUMENTS

| | | | | |
|---|---|---|---|---|
| 5,489,882 A | * | 2/1996 | Ueno ........................ 333/206 |
| 5,649,350 A | * | 7/1997 | Lampe et al. ................. 29/600 |
| 5,818,883 A | * | 10/1998 | Smith et al. ................. 375/347 |
| 5,854,986 A | * | 12/1998 | Dorren et al. ........... 455/562.1 |
| 6,014,551 A | | 1/2000 | Pesola et al. ................. 455/86 |
| 6,188,877 B1 | * | 2/2001 | Boesch et al. ................ 455/74 |
| 6,326,921 B1 | | 12/2001 | Egorov et al. .............. 343/700 |
| 6,351,236 B1 | * | 2/2002 | Hasler .................... 342/357.09 |
| 6,356,602 B1 | * | 3/2002 | Rodal et al. ................. 375/344 |
| 2001/0015676 A1 | * | 8/2001 | Takikawa et al. ........... 330/307 |
| 2001/0019575 A1 | * | 9/2001 | Kohno et al. ............. 375/131 |
| 2003/0060185 A1 | * | 3/2003 | Fisher et al. ................. 455/344 |

FOREIGN PATENT DOCUMENTS

| | | | |
|---|---|---|---|
| EP | 0678974 | 10/1995 | ............ H03D/7/16 |
| EP | 1 187 208 | 3/2002 | |

* cited by examiner

Primary Examiner—Edward F. Urban
Assistant Examiner—C. Chow
(74) Attorney, Agent, or Firm—Ware, Fressola, Van der Sluys & Adolphson LLP

(57) ABSTRACT

A function-oriented manufacturing approach in RF front-end architecture for use in a multi-band mobile phone. Electronic components in a front-end module, such as low-noise amplifiers that require the demanding silicon bipolar process, are fabricated separately from those components in an RF-ASIC that require the less demanding, yet more costly, Bi-CMOS process. When the transmission frequency band and the receiving band overlap, separate receiving antenna and transmitting antenna are used, instead of an antenna switch module with a duplexer, connected to separate bandpass filters for band selection. Differential Rx antennas are used so that the whole Rx-chain can be made differential. Furthermore, different impedances for Tx out and Rx in can be realized.

16 Claims, 9 Drawing Sheets

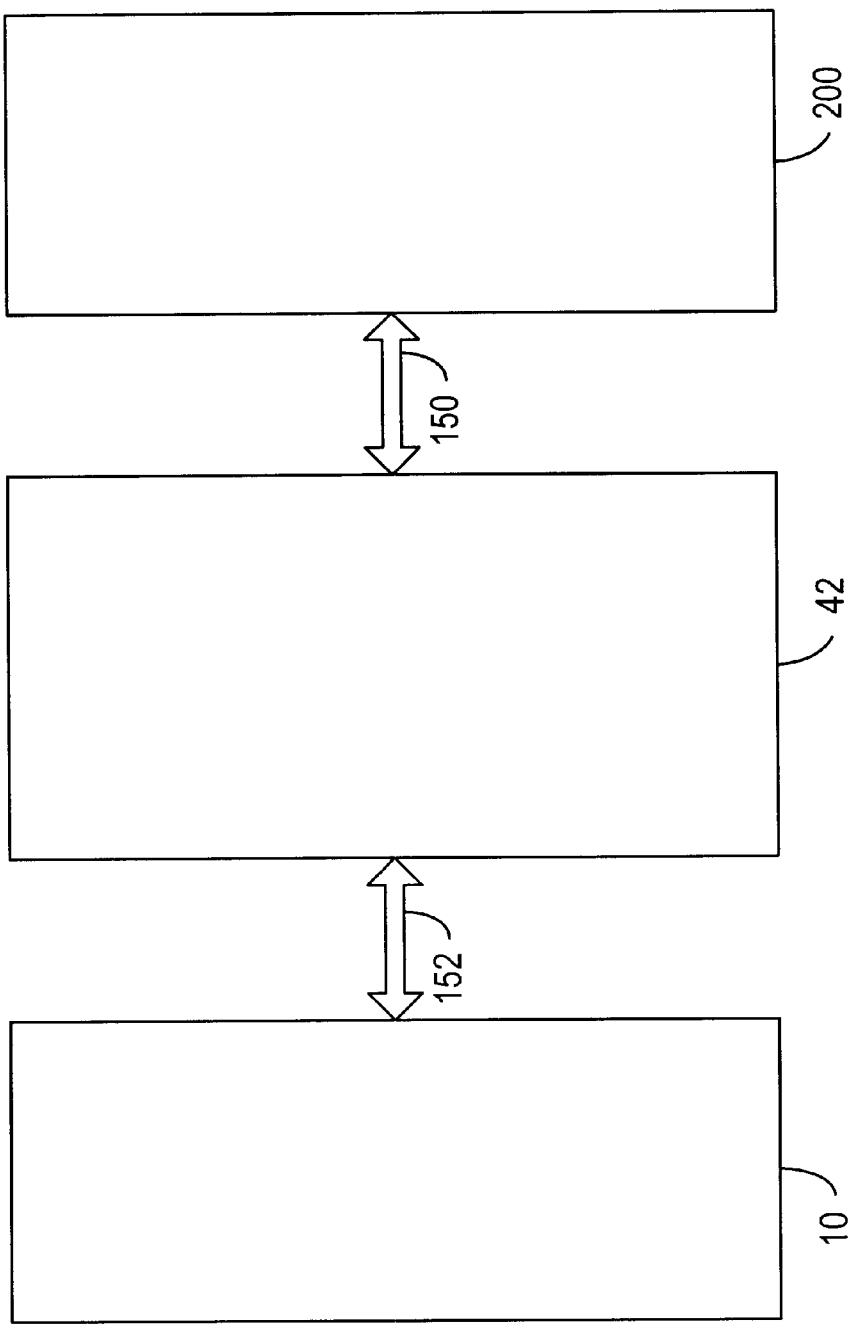

VERSATILE RF FRONT-END MULTIBAND MOBILE TERMINALS

FIELD OF THE INVENTION

The present invention relates generally to the RF (radio frequency) front-end of a mobile terminal and, more particularly, to the RF front-end for a multi-band mobile terminal.

BACKGROUND OF THE INVENTION

Current trends in the architecture and design of mobile phones are based on multi-band and multi-mode operation. These trends could affect all functional blocks of mobile phone architecture including the RF front-end. At the same time, the development of mobile phones is moving toward high integration of components in order to reduce the manufacturing cost as well as the size of the mobile phone. The implementation of several bands at different frequencies into one mobile phone gives rise to many technical challenges. Typically, the RF front-end architecture and the integrated circuit linking to the front-end are specially designed for each band. The integrated circuit is usually an RF-ASIC (application specific integrated circuit), which includes one or more mixers for down-converting received RF signals to the intermediate frequencies (IF), or for up-converting IF signals to RF frequencies for transmission. The front-end typically includes an antenna, one or more Rx filters and an antenna switch module for mode selection, as shown in FIG. 1. The low noise amplifiers (LNAs) necessary for strengthening the received signals are either discrete components or they are components integrated into the RF-ASIC. The Rx filters between the antenna and the LNA are either discrete components or they are included in the antenna switch module. For some frequency band combinations, the integration of Rx filters into the antenna switch module (ASM) is possible but costly. Such integration restricts the control currents to about 10 mA, and, consequently, the insertion loss in the ASM is relatively high. For other frequency band combinations, the filters and switches in the ASM do not have adequate isolation, especially when the Tx and Rx bands overlap. For example, in a mobile phone that is capable of operating in both PCS1900 and DCS 1800 bands, the PCS1900 Tx frequencies (1850–1910 MHz) and the DCS1800 Rx frequencies (1805–1880 MHz) overlap in the frequency range of 1850–1880 MHz. In the front-end design such as that shown in FIG. 1, the isolation between PCS 1900 Tx and DCS 1800 Rx components is only about 20 to 30 dB, and the leakage power at the bond wire connecting the 1800 MHz Rx amplifier in the RF-ASIC and the bandpass filter in the ASM is approximately 0 to +10 dB. Band overlapping makes this frequency band combination problematic. Similarly, the WCDMA Tx frequencies and the PCS 1900 Rx frequencies overlap. As a result, a significant amount of the Tx signal leaks directly to the input of the Rx LNA. If the LNAs are disposed in the RF-ASIC, the signal present at the bond wires or at the inputs of the RF-ASIC can leak to other parts of the ASIC due to cross-talk. The leakage power can result in intolerably large phase errors in the Tx, for example. One remedy to this problem is to add diodes or transistors to the Rx lines of the problematic Rx paths in order to increase isolation, but this will result in increased cost, current assumption and hardware area.

Furthermore, when the band combination involves a time division multiple access standard (such as GSM) and frequency or coded multiple access standard (such as CDMA where both the Rx and Tx are active at the same time), the front-end requires a duplex filter. The specifications for such duplexers are very stringent. Such duplexers can be realized with ceramic filters, SAW or BAW-based filters. The ceramic filters are large in size and the SAW or BAW-based filters are costly. Thus, the combination of a GSM-like standard and a CDMA-like standard remains a challenge.

It is advantageous and desirable to provide a versatile radio-frequency front-end for use with a radio-frequency application-specific integrated circuit (RF-ASIC) in a multi-band mobile phone. The front-end is designed to avoid the aforementioned problems associated with the current front-end design approach.

SUMMARY OF THE INVENTION

It is a primary object of the present invention to provide a versatile RF front-end architecture that would make it easier to re-use an RF-ASIC (application specific integrated circuit), for different band combinations. It is another object of the present invention to provide a method and front-end device for improving the isolation in an antenna system when the transmission frequency band and the receiving band overlap. It is yet another object of the present invention to reduce the cost of producing RF-front-end components and large RF-ASICs. These objects can be achieved by adopting a function-oriented manufacturing approach, wherein the filters, amplifiers, and possibly mixers, are fabricated separately from other signal processing components. In the modular approach according to the present invention, electronic components in a front-end module, such as low-noise amplifiers, that require the demanding silicon bipolar process are fabricated separately from those components in RF-ASICs that can utilize most optimized process for the required functions. When the transmission frequency band and the receiving band overlap, the present invention uses a receiving antenna and a transmitting antenna separately connected to a receiver and a transmitter, instead of an antenna switch module with a duplexer, thereby improving the isolation in the antenna system.

Thus, according to the first aspect of the present invention, there is provided a radio-frequency front-end (100) for use with a radio-frequency signal processor (200) in a multi-band mobile terminal, the mobile terminal capable of operating in a plurality of frequency bands including a first frequency band and a different second frequency band, the front-end adapted to convey signals to and from the signal processor via a connection means (150), wherein the mobile terminal comprises:

an antenna system (10);

a first receiver ($52_2$) for receiving first signals in the first frequency band, from the antenna system;

a second receiver ($52_3$) for receiving second signals in the second frequency band from the antenna system;

a first transmitter ($53_1$) for providing third signals in the first frequency band to the antenna system for transmission; and a second transmitter ($53_2$) for providing fourth signals in the second frequency band to the antenna system for transmission. The radio-frequency front-end is characterized in that the antenna system comprises:

a first receiving antenna ($12_a$, $12_b$), operable in the first frequency band and operatively connected to the first receiver ($52_2$), for allowing the first receiver to receive the first signals;

a second receiving antenna ($12_c$, $12_d$), operable in the second band and operatively connected to the second receiver ($52_3$), for allowing the second receiver to receive the second signals;

a first transmitting antenna ($12_g$), operable in the first band and operatively connected to the first transmitter ($53_1$), for transmitting the third signals.

a second transmitting antenna ($12_h$), operable in the second band and operatively connected to the second transmitter ($53_2$), for transmitting the fourth signals. The front-end is further characterized by:

a first frequency filter ($32_2$), operatively connected to the first receiver ($52_2$) and the first receiving antenna ($12_a$, $12_b$), for frequency filtering the first signals;

a second frequency filter ($32_3$), operatively connected to the second receiver ($52_3$) and the second receiving antenna ($12_c$, $12_d$), for frequency filtering the second signals;

a third frequency filter ($32_4$), operatively connected to the first transmitter ($53_1$) and the first transmitting antenna ($12_g$), for frequency filtering the third signals; and a fourth frequency filter ($32_5$), operatively connected to the second transmitter ($53_2$) and the second transmitting antenna ($12_h$), for frequency filtering the fourth signals.

Advantageously, the front-end further comprises:

a first down-converting element ($55_3$, $55_4$), operatively connected to the first receiver ($52_2$), for down-converting the first signals for providing down-converted first signals to the signal processor; and a second down-converting element ($55_5$, $55_6$), operatively connected to the second receiver ($52_3$), for down-converting the second signals for providing down-converted second signals to the signal processor.

Preferably, the frequency filters are bulk acoustic wave filters.

Preferably, the first and second frequency filters are balanced filters.

According to the present invention, when the plurality of frequency bands further includes a third frequency band, and the mobile terminal further comprises:

a third receiver ($52_1$) for receiving fifth signals in the third frequency band from the antenna system; and a third transmitter ($53_3$) for providing sixth signals in the third frequency to the antenna system for transmission, the front-end is further characterized in that the antenna system further comprises:

a third receiving antenna ($12_e$, $12_f$), operable in the third band and operatively connected to the third receiver ($52_1$), for allowing the third receiver to receive the fifth signals; and a third transmitting antenna ($12_i$), operable in the third band and operatively connected the third transmitter ($53_3$), for transmitting the sixth signals, and further characterized by a fifth frequency filter ($32_1$), operatively connected to the third receiver ($52_1$) and the third receiving antenna ($12_e$, $12_f$), for frequency filtering the fifth signals; and a sixth frequency filter ($32_6$), operatively connected to the third transmitter ($53_3$) and the third receiving antenna ($12_i$), for transmitting the sixth signals. The sixth frequency filter may be fed by a mixer or up-converting element ($210_n$).

Alternatively, when said plurality of frequency bands further includes a third frequency band, and the mobile terminal further comprises:

a third receiver ($52_1$) for receiving fifth signals in the third frequency band from the antenna system;

a third transmitter ($53_3$) for providing sixth signals in the third frequency to the antenna system for transmission, the front-end is further characterized in that the first receiving antenna ($12_a$, $12_b$) is also operable in the third frequency band;

the antenna system further comprises a third transmitting antenna ($12_i$), operable in the third band and operatively connector the third transmitter ($53_3$), for transmitting the sixth signals, and is further characterized by a fifth frequency filter ($32_1$), operatively connected to the third receiver ($52_1$) and the first receiving antenna ($12_a$, $12_b$), for frequency filtering the fifth signals;

a sixth frequency filter ($32_6$), operatively connected to the third transmitter ($53_3$) and the third receiving antenna ($12_i$), for frequency filtering the sixth signals; and a phase shifter (14), operatively connected between the first frequency filter ($32_2$) and the fifth frequency filter ($32_1$) for matching the first and fifth frequency filters.

According to the second aspect of the present invention, there is provided a method of improving the flexibility in use of a radio-frequency front-end (100) with a radio-frequency signal processor (200) in a multi-band mobile terminal, the mobile terminal capable of operating in a plurality of frequency bands including a first frequency band and a different second frequency band, the front-end adapted to convey signals to and from the signal processor via a connection means (150), wherein the mobile terminal comprises:

an antenna system (10);

a first receiver ($52_2$) for receiving first signals in the first frequency band, from the antenna system;

a second receiver ($52_3$) for receiving second signals in the second frequency band from the antenna system;

a first transmitter ($53_1$) for providing third signals in the first frequency band to the antenna system for transmission; and a second transmitter ($53_2$) for providing fourth signals in the second frequency band to the antenna system for transmissions, said method characterized by providing in the antenna system a first receiving antenna ($12_a$, $12_b$), operable in the first frequency band and operatively connected to the first receiver ($52_2$), for allowing the first receiver to receive the first signals, and a first frequency filter ($32_2$), operatively connected to the first receiver ($52_2$) and the first receiving antenna ($12_a$, $12_b$), for frequency filtering the first signals;

providing in the antenna system a second receiving antenna ($12_c$, $12_d$), operable in the second band and operatively connected to the second receiver ($52_3$), for allowing the second receiver to receive the second signals, and a second frequency filter ($32_3$), operatively connected to the second receiver ($52_3$) and the second receiving antenna ($12_c$, $12_d$), for frequency filtering the second signals;

providing in the antenna system a first transmitting antenna ($12_g$), operable in the first band and operatively connected to the first transmitter ($53_1$), for transmitting the third signals, and a third frequency filter ($32_4$), operatively connected to the first transmitter ($53_1$) and the first transmitting antenna, for frequency filtering the third signals; and providing in the antenna system a second transmitting antenna ($12_h$), operable in the second band and operatively connected to the second transmitter ($53_2$), for transmitting the fourth signals, and a fourth frequency filter ($32_5$), operatively connected to the second transmitter ($53_2$) and the second transmitting antenna ($12_h$), for frequency filtering the fourth signals.

Advantageously, the method is further characterized by providing a first down-converting element ($55_3$, $55_4$), operatively connected to the first receiver ($52_2$), for down-converting the first signals for providing down-converted first signals to the signal processor. Advantageously, the method is further characterized by providing a second down-converting element ($55_5$, $55_6$), operatively connected to the second receiver ($52_3$), for down-converting the second signals for providing down-converted second signals to the signal processor.

Preferably, when said plurality of frequency bands further includes a third frequency band, and the mobile terminal further comprises:

a third receiver ($52_1$) for receiving fifth signals in the third frequency band from the antenna system; and a third transmitter ($53_3$) for providing sixth signals in the third frequency to the antenna system for transmission, the method is further characterized by providing in the antenna system a third receiving antenna ($12_e$, $12_f$), operable in the third band and operatively connected to the third receiver ($52_1$), for allowing the third receiver to receive the fifth signals, and a fifth frequency filter ($32_1$), operatively connected to the third receiver ($52_1$) and the third receiving antenna ($12_e$, $12_f$), for frequency filtering the fifth signals; and providing a third transmitting antenna ($12_i$), operable in the third band and operatively connected to the third transmitter ($53_3$), for transmitting the sixth signals, and a sixth frequency filter ($32_6$), operatively connected to the third transmitter ($53_3$) and the third receiving antenna ($12_i$), for transmitting the sixth signals.

Alternatively, when said plurality of frequency bands further includes a third frequency band, and the mobile terminal further comprises:

a third receiver ($52_1$) for receiving fifth signals in the third frequency band from the antenna system;

a third transmitter ($53_3$) for providing sixth signals in the third frequency to the antenna system for transmission, the method is further characterized in that the first receiving antenna ($12_a$, $12_b$) is also operable in the third frequency band, and the antenna system further comprises a third transmitting antenna ($12_i$), operable in the third band and operatively connected to the third transmitter ($53_3$), for transmitting the sixth signals, and the method is further characterized by providing in the antenna system:

a fifth frequency filter ($32_1$), operatively connected to the third receiver ($52_1$) and the first receiving antenna ($12_a$, $12_b$), for frequency filtering the fifth signals;

a sixth frequency filter ($32_6$), operatively connected to the third transmitter ($53_3$) and the third receiving antenna ($12_i$), for frequency filtering the sixth signals; and a phase shifter (14), operatively connected between the first frequency filter ($32_2$) and the fifth frequency filter ($32_1$) for matching the first and fifth frequency filters.

The present invention will become apparent upon reading the description taken in conjunction with FIGS. 2 to 6.

BRIEF DESCRIPTION OF THE DRAWINGS

FIG. 4d is a block diagram showing the connections between the RF ASIC and component blocks in the RF front-end.

BEST MODE TO CARRY OUT THE INVENTION

Figure 2:
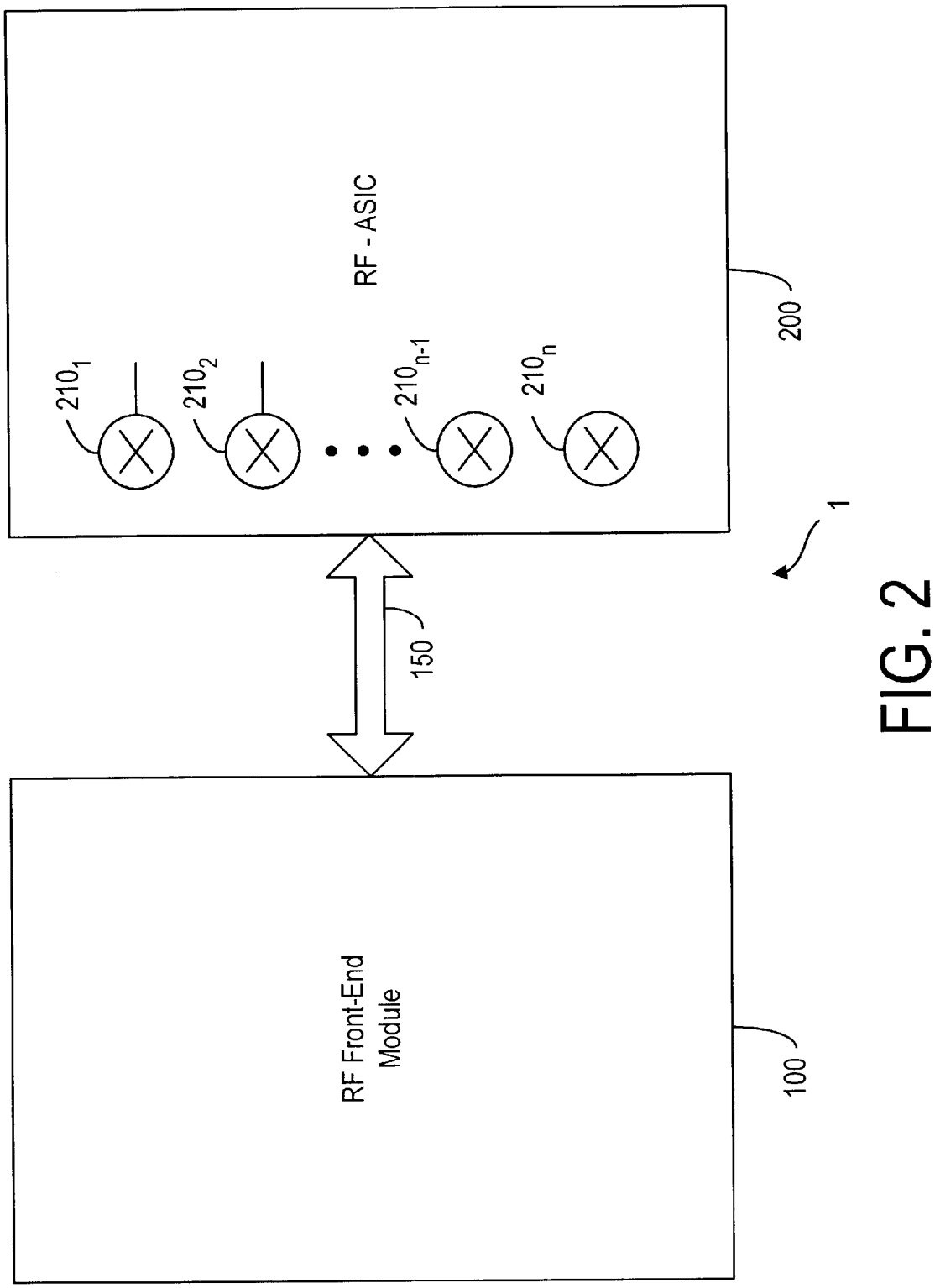
FIG. 2 is a block diagram showing the relationship between an RF front-end and an RF-ASIC, according to the present invention.
Figure 3:
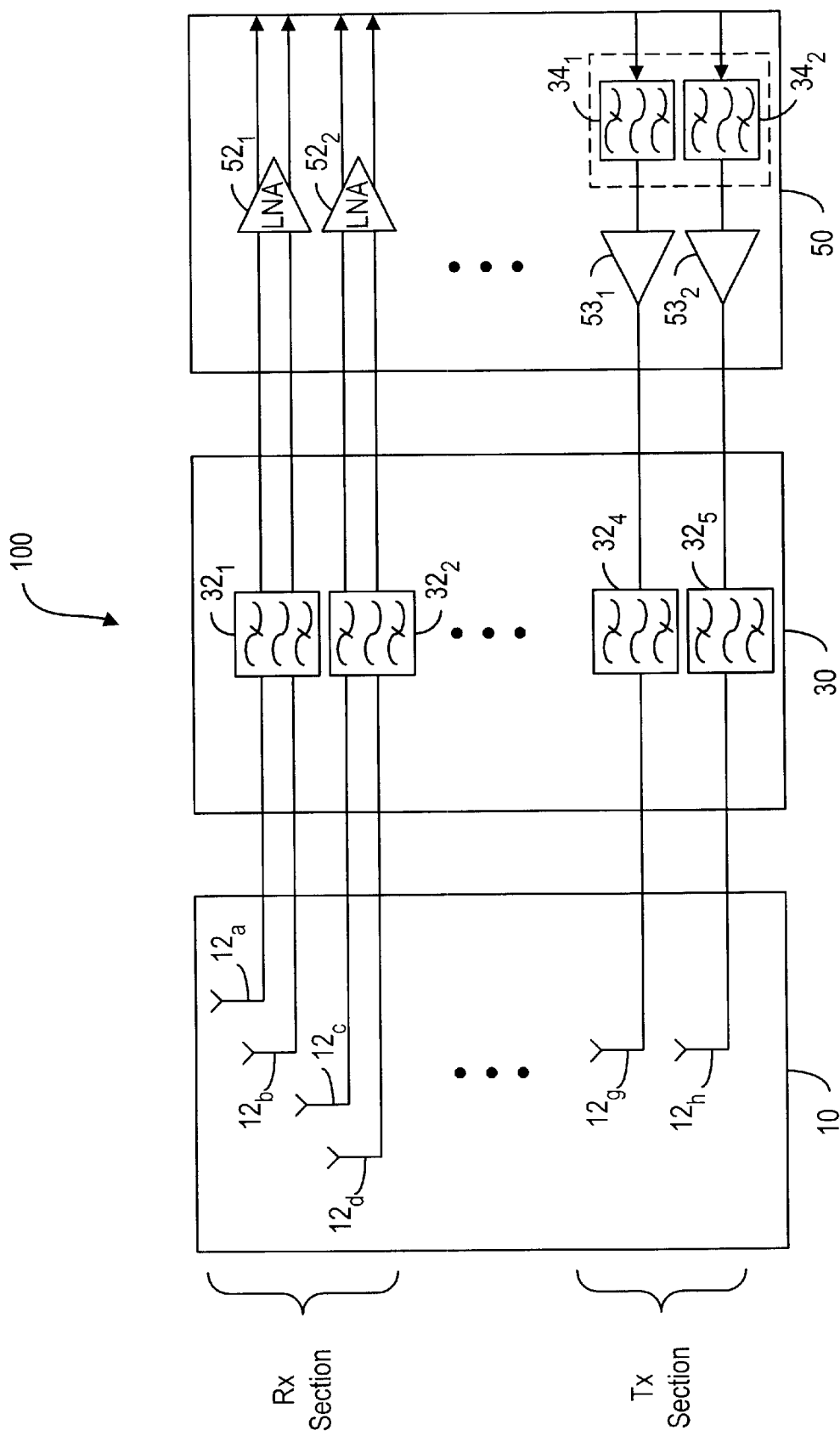
FIG. 3 is a block diagram showing a basic building block of an RF front-end, according to the present invention

It is an objective of the present invention to provide a versatile and flexible RF front-end architecture that would make it easier to re-use an RF-ASIC in different frequency band combinations. In order to achieve this objective, it is advantageous and desirable that the RF front-end module includes filters and amplifiers necessary for the multi-band requirements of a mobile terminal. The filters and amplifiers in such an RF front-end module are physically separated from the RF-ASIC. As shown in FIG. 2, the transceiver system 1 for a multi-band mobile phone (not shown) comprises an RF front-end module 100 interconnected with an RF-ASIC 200 by a connector 150 based on the multi-band requirements of the mobile phone. Preferably, the RF-ASIC 200 comprises a plurality of mixers $210_1$, $210_2$, . . . , $210_n$ as the first functional components of the ASIC to perform up-conversion or down-conversion operations as required. For illustration purposes, the versatile RF front-end 100, according to the present invention, comprises three blocks: an antenna block 10, a filter block 30 and an amplifier block 50, as shown in FIG. 3. Each of the blocks can be viewed as having an Rx section and a Tx section. As shown in FIG. 3, the Rx section of the amplifier block 50 includes a plurality of low noise amplifiers (LNAs) 52. Thus, it is possible that one or more of the mixers can be implemented in the Rx section of the RF-front end module to be part of a chip containing the LNAs 52. In that case, the first function block of the RF_ASIC may contain one or more amplifiers for the down-converted signals.

In general, the antenna block 10 comprises a plurality of antennas $12_a$, $12_b$, ... to meet the frequency requirements for multi-band application. The filter block 30, preferably, comprises a plurality of passband filters $32_1$, $32_2$, ... for frequency filtering and frequency selection. Advantageously, the filters in the Rx section are balanced-in, balanced-out filters. Alternatively, one or more filters in the Rx section are single-ended filters. Preferably, bulk acoustic wave (BAW) filters are used because of their superior power handling capability. In particular, thin-film bulk acoustic resonators (FBARs) are less susceptible to electrostatic discharge (ESD). The amplifier block 50 comprises a plurality of low noise amplifiers (LNAs) $52_1$, $52_2$, ... in the Rx section and a plurality of power amplifiers (PAs) $53_1$, $53_2$, ... in the Tx section. One or more optional filters $34_1$, $34_2$ may be included in the Tx section. The optional filters are used if systems requirements of a specific standard call for such filters. Furthermore, one or more 90° phase-shifters may also be implemented on the RF front-end 100, if necessary, as shown in FIGS. 4a and 4b.

Figure 4A:
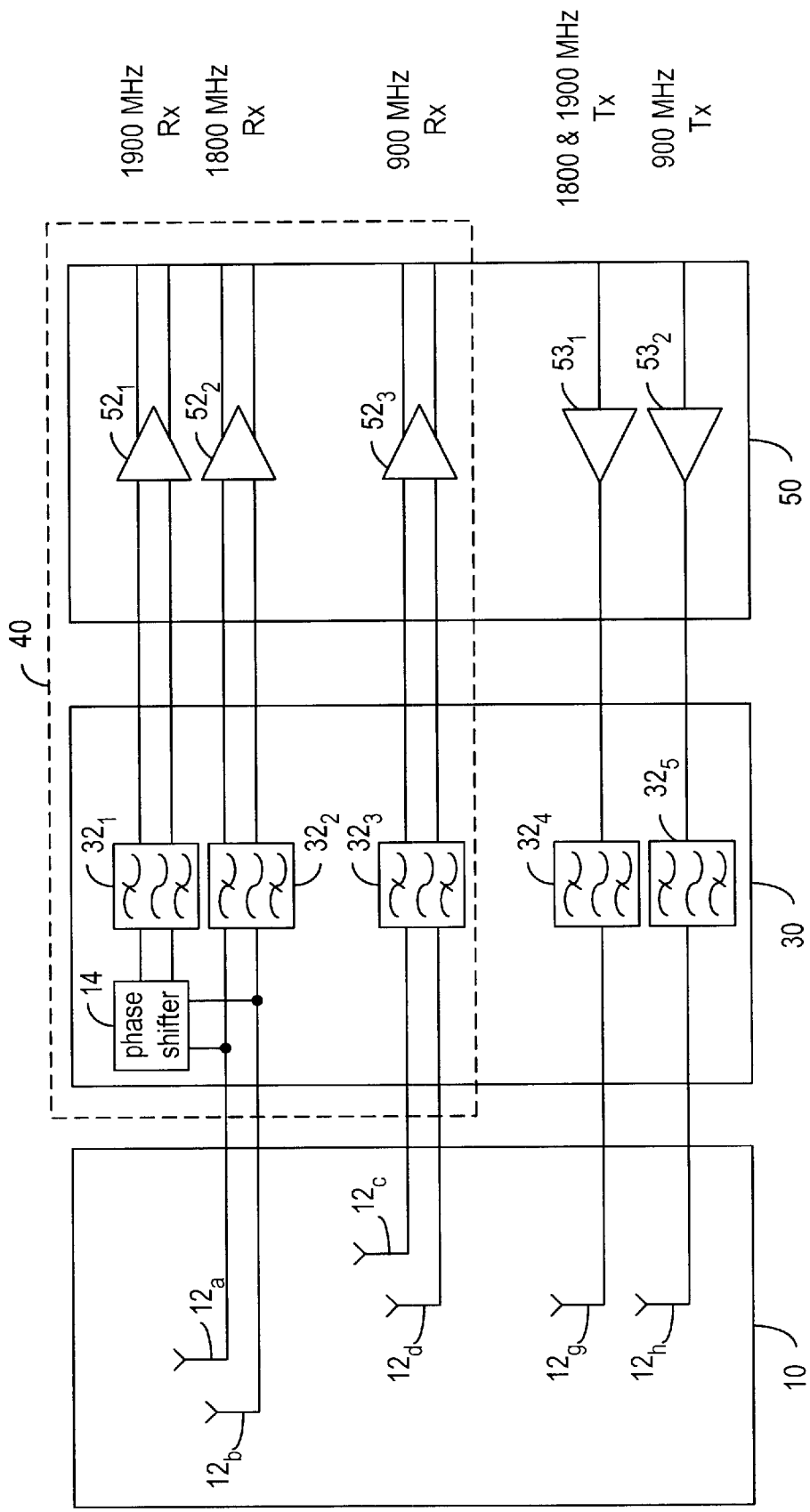
FIG. 4a is a block diagram showing an exemplary architecture of the RF front-end for use in a tri-band mobile phone.
Figure 4B:
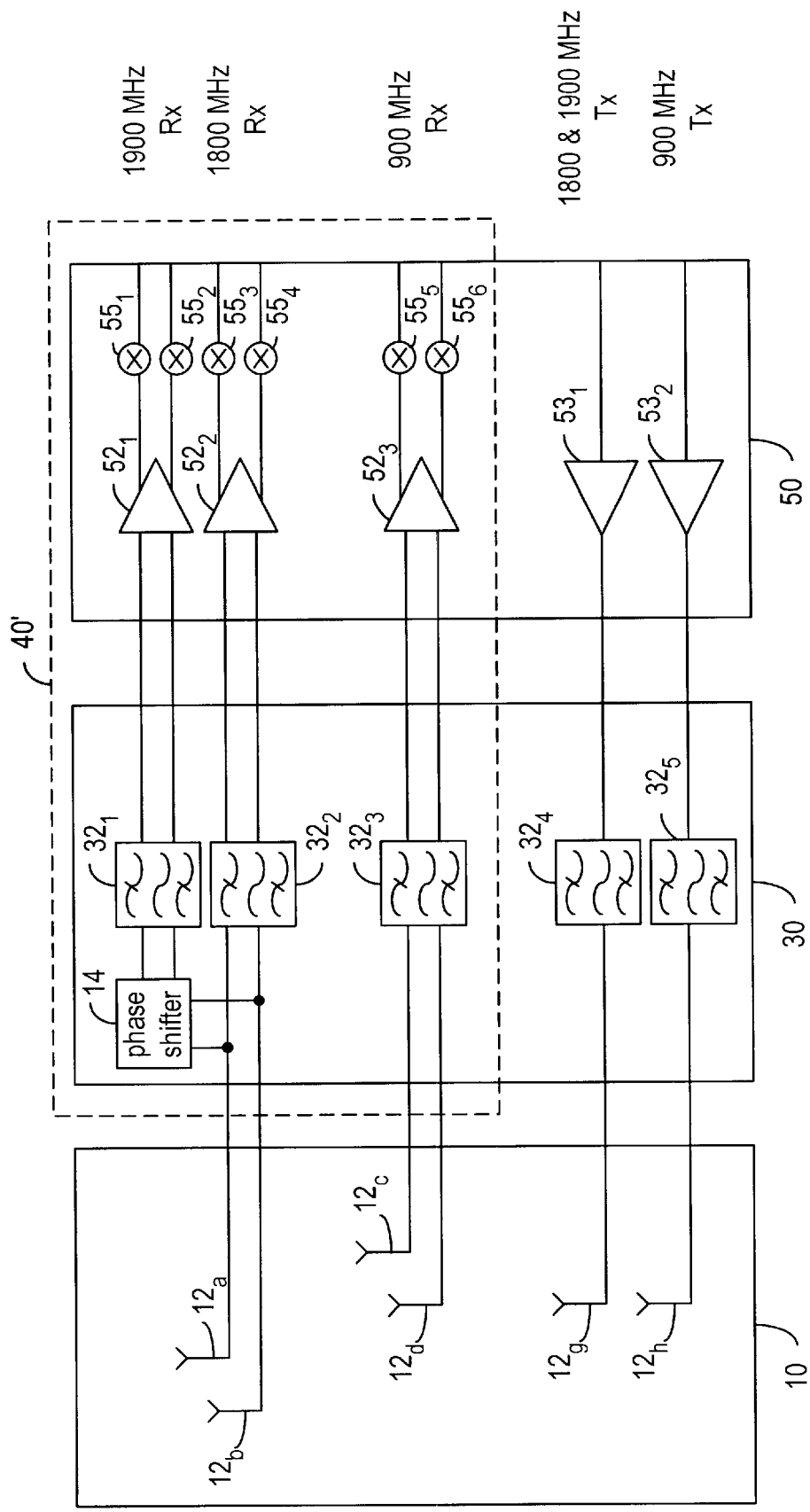
FIG. 4b is a block diagram showing another architecture of the RF front-end, which includes a plurality of down-converting elements.

FIG. 4a is an exemplary architecture for the RF front-end 100, according to the present invention. This architecture is designed to meet the requirements of a tri-band mobile phone operating in the GSM 900, PCS 1900 and DCS 1800 frequencies. As shown in FIG. 4a, fileters $32_1$, $32_2$ and LNAs $52_1$, $52_2$ are used for $PCS_{13}Rx$ (1930–1990 MHz) and DCS_Rx (1805–1880 MHz); filter $32_3$ and LNA $52_3$ are used for GSM_Rx (925–960 MHz); filters $32_4$ and PA $53_1$ are used for PCS_Tx (1850–1910 MHz) and DCS_Tx (1710–1785 MHz); and filter $32_5$ and PA $53_2$ are used for GSM_Tx (880–915 MHz). The Tx amplifiers are typically power amplifiers (PAs). Because the frequencies for PCS 1900 Rx and DCS 1800 Rx are closely spaced, it is preferred that two Rx antennas $12_a$, $12_b$ are used to convey received signals, through a 90° phase-shifter 14, to four inputs of two balanced filters $32_1$, $32_2$. Because the frequencies of PCS Rx and DCS Rx are closely spaced, it is possible to use only one common antenna (differential or single-ended) for these two bands. The 90° phase shifter is then needed to match the two Rx-filters to the antenna port.

In FIG. 4a, because the filter $32_3$ is a balanced filter, it is connected to two antennas $12_c$, $12_d$ to receive signals therefrom. The filters $32_4$, $32_5$ are single-ended. They are separately connected to tow antennas $12_g$, $12_h$.

Figure 1:
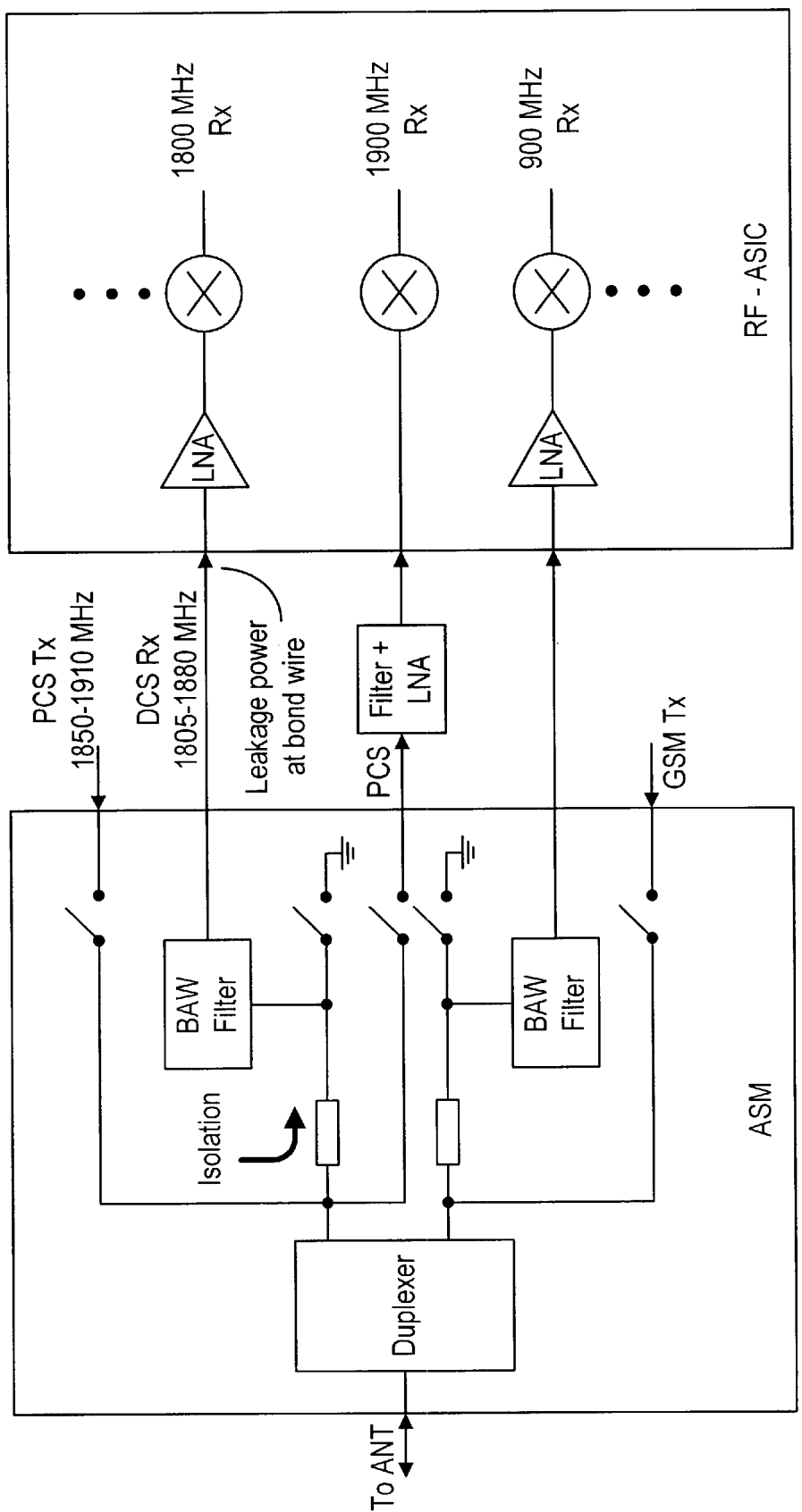
FIG. 1 is a block diagram showing a prior art front-end architecture for use in a triband mobile phone.

In a preferred embodiment of the present invention, the filters $32_1$, $32_2$, $32_3$ and LNAs $52_1$, $52_2$, $52_3$ of the Rx section are advantageously combined into a sub-module 40. Advantageously, the phase-shifter 14 is also disposed in the sub-module 40. Here, the use of separate Tx and Rx antennas makes it possible to optimize the SAR (specific absorption rate) values of the Tx part independently of the omnidirectionality of the Rx antennas. Also, the impedance level of the Tx and Rx antennas can be different from the conventional 50 Ohms. For example, the impedance level for the Rx antennas $12_a$, $12_b$, $12_c$, $12_d$ can be 100 Ohms. Preferably, the RX antennas $12_a$, $12_b$, $12_c$, $12_d$ are differential antennas, making it possible that filters $32_1$, $32_2$, $32_3$ are fully differential. In general, fully differential filters exhibit better performance, such as better isolation, than single-ended filters. Furthermore, because the Tx and Rx isolation can be obtained by the filter/antenna combination, the use of an antenna switch module, such as that shown in FIG. 1, becomes unnecessary. Consequently, the losses in the Tx and Rx paths can be significantly reduced, and current consumption and required area can also be reduced.

Because typical LNAs can be fabricated with the same technology as mixers for down-conversion in the Rx section, it is advantageous and desirable to also include one or more mixers or down-converting functions in the Rx section of the RF-front end module. As shown in FIG. 4b, a plurality of mixers $55_1$, $55_2$, $55_3$, ... are disposed in the sub-module 40 to be fabricated along with the LNAs $52_1$, $52_2$, $52_3$.

Figure 4C:
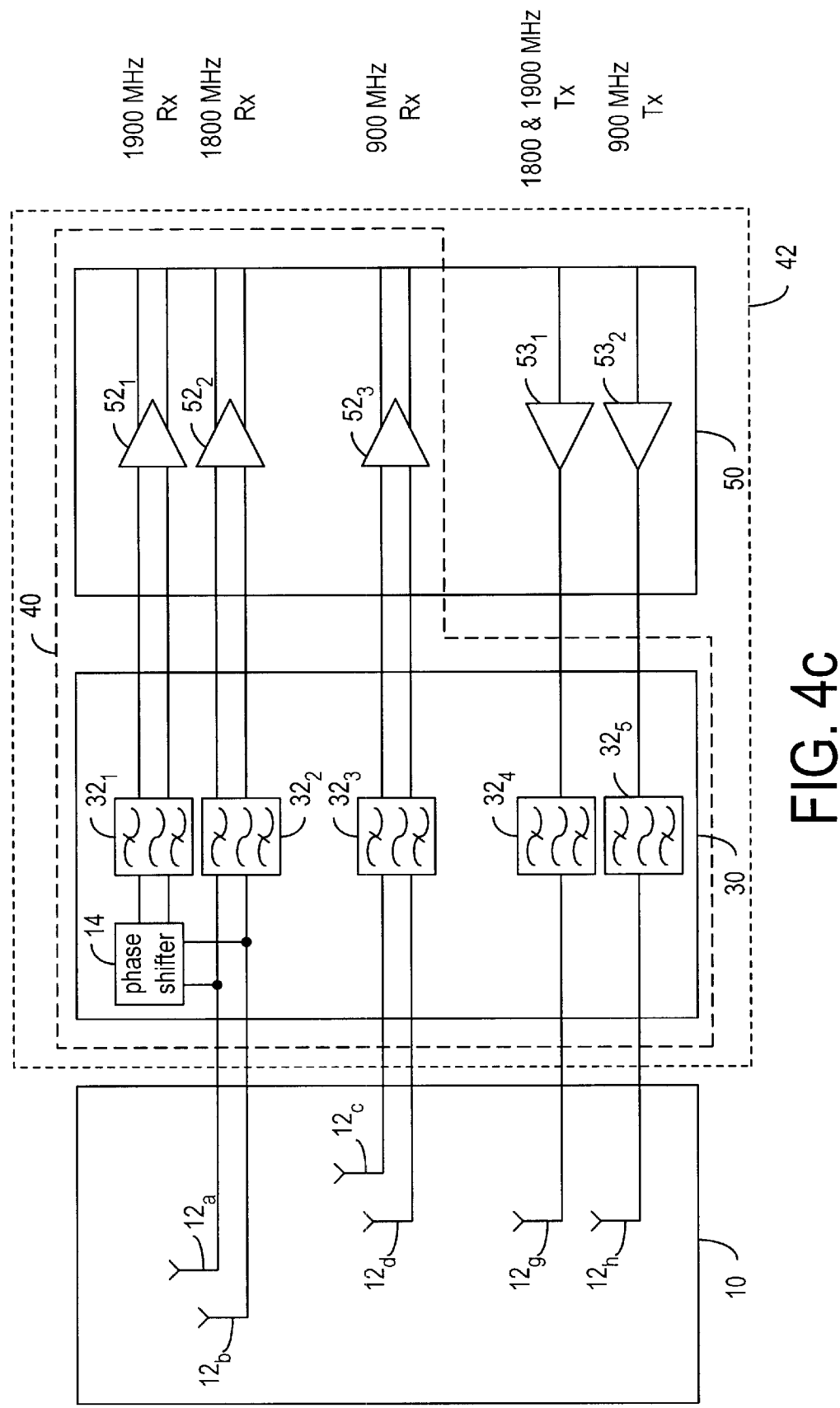
FIG. 4c is a block diagram showing a sub-module in the RF front-end, which includes both the Rx and Tx filters.
Figure 5:
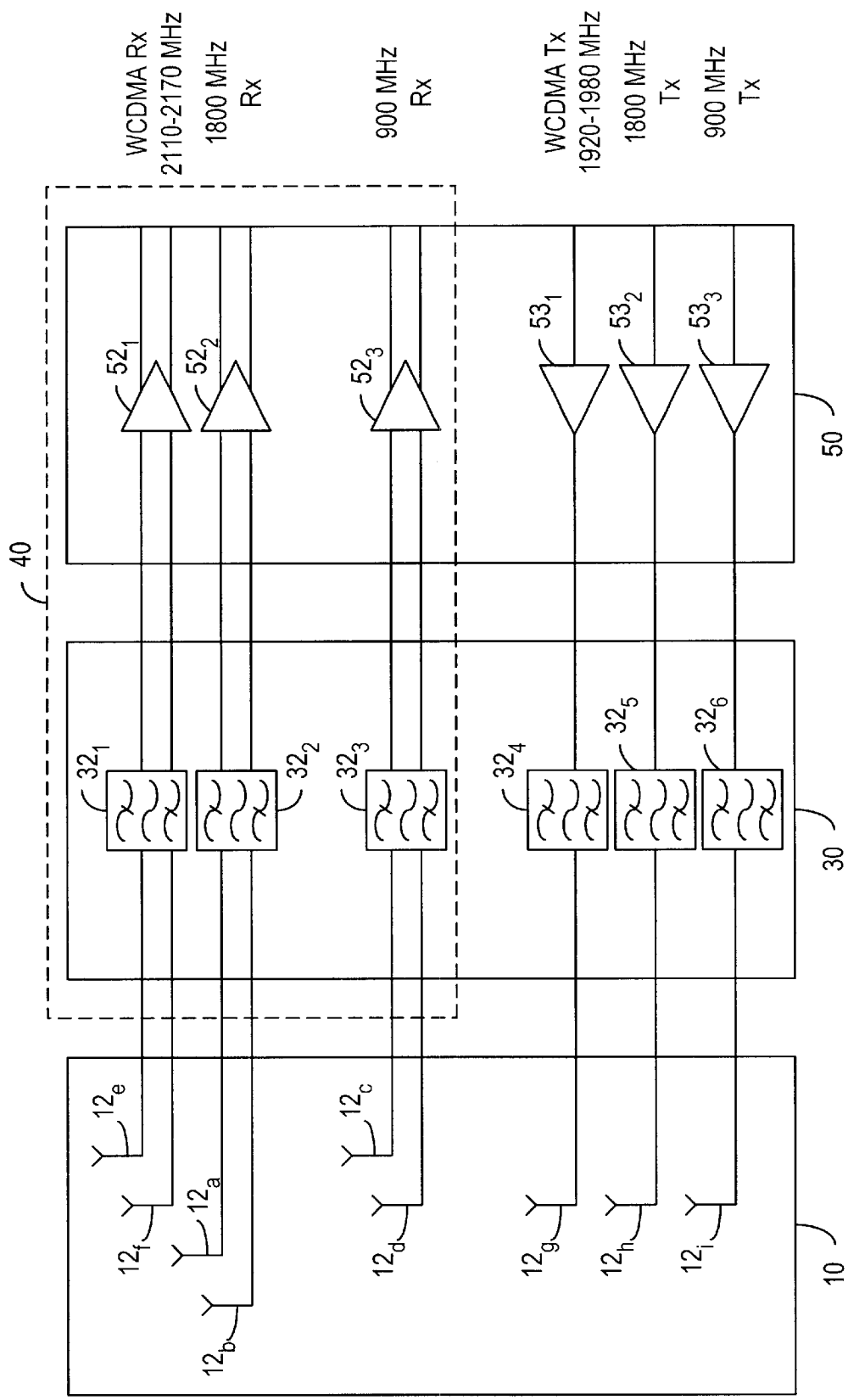
FIG. 5 is a block diagram showing a front-end architecture for use in a multi-band mobile phone, where one of the bands is CDMA.

Advantageously, the sub-module 40 may also include the filters $32_4$, $32_5$ in the Tx section, as shown in FIG. 4c, if the filters $32_4$, $32_5$ and filters $32_1$, $32_2$, $32_3$ are made from the same process, such as BAW. Furthermore, it is possible to assemble the components in block 30 and the components in block 50 into one unit 42. As such, the unit 42 can be electronically connected to the RF-ASIC with the connector 150 and separately connected to the antenna block 10 with another connector 152, as shown in FIG. 4d. Moreover, separate antennas $12_e$, $12_f$ can be used with the filter $32_1$, as shown in FIG. 5. In that case, the phase shifter 14 is not needed.

FIG. 5 is another exemplary RF front-end architecture, which can be used with multi-band mobile phones, wherein one of the bands is WCDMA (2110–2170 MHz for RX, 1920–1980 MHz for Tx). As shown in FIG. 5, filters $32_1$ and LNA $52_1$ are used for WCDMA_Rx; and filter $32_4$ and PA $53_1$ are used for WCDMA_Tx. Because of the differences in the Tx and Rx frequencies, filters $32_1$, $32_4$ act like a duplexer in a typical antenna switch module (see FIG. 1). It is also possible that one or more mixers are included in the sub-module 40 to be fabricated along with the LNAs $52_1$, $52_2$, $52_3$, similar to FIG. 4b.

Figure 6:
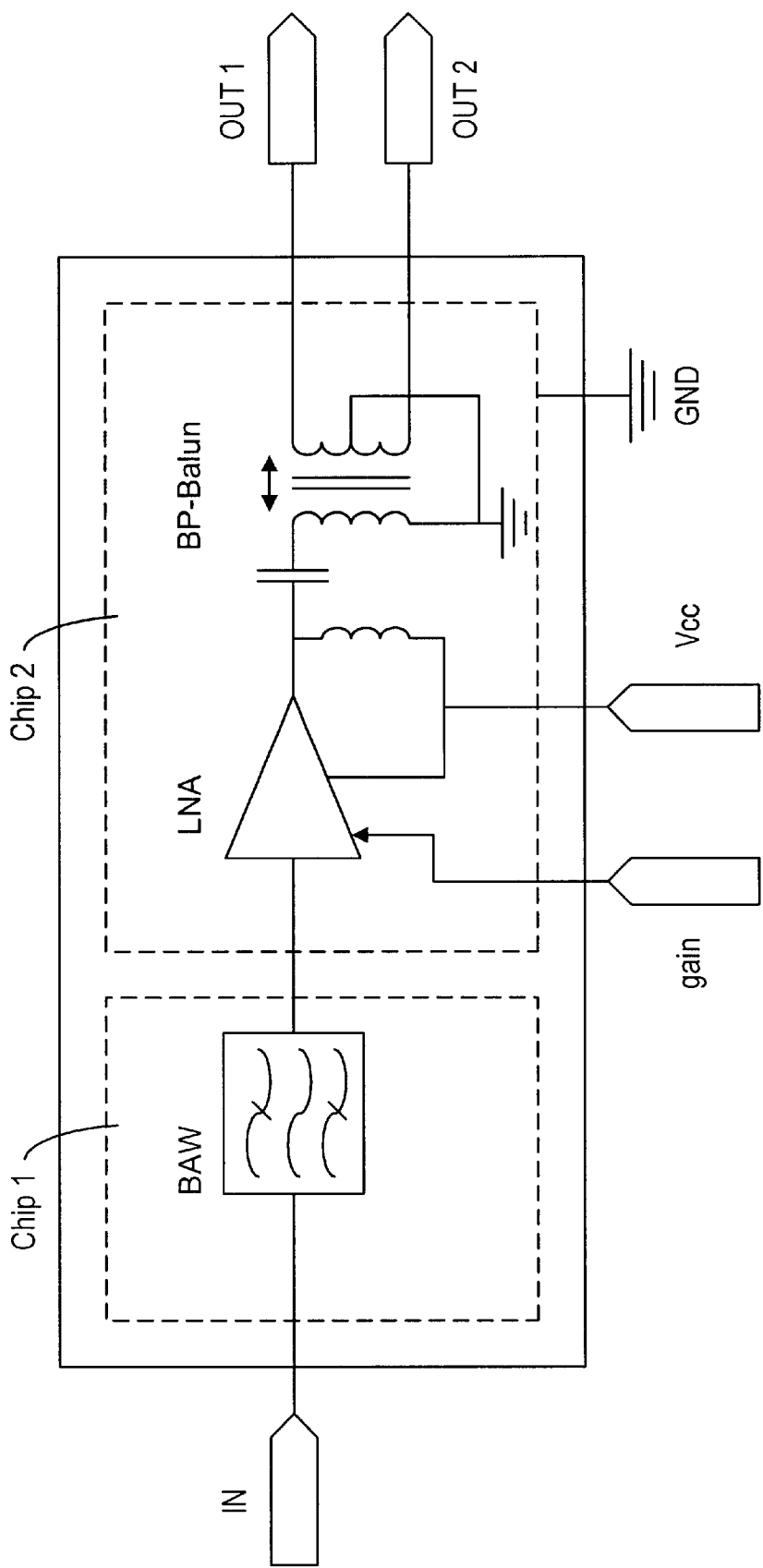
FIG. 6 is a block diagram showing an exemplary RF front-end module, according to the present invention.

By combining filters and amplifiers into a sub-module, such as the sub-module 40 shown in FIGS. 4a, 4b and 5, it is possible to use bare die filters (BAW filters, for example) in one chip and to fabricate LNAs in another chip using a silicon bipolar process, for example. The chip containing LNAs and the chip containing bare die filters can be a flip-chip attached to an organic laminate module board. Such a manufacturing process yields circuit components of small height, small size and low cost. FIG. 6 is an exemplary sub-module 40. As shown, BAW filters are fabricated as bare die filters on chip 1, and LNAs and related components are fabricated using a silicon bipolar process on chip 2. By disposing LNAs in the RF front-end 100 and not in the RF-ASIC 200 (FIG. 2), the cross-talk problem associated with certain frequency bands can be significantly reduced or substantially eliminated. In general, the manufacturing requirements for LNAs (and also mixers to a lesser degree) are demanding, while the requirements for other signal processing parts are less demanding. This means that the process selected for the large RF-ASIC can be optimized for the less demanding functions resulting in cost savings. For similar reasons, the chip containing LNAs, (and possibly mixers or downconverting elements) would also be less costly, since it would only have to be optimized for the respective functions, using the bipolar process instead of Bi-CMOS. Furthermore, if the LNAs and possibly the mixers are outside the ASIC, the expensive Bi-CMOS process, which is typically required in the fabrication of ASIC, is only used to fabricate the part that performs the rest of the signal processing. It would be advantageous to fabricate the front-end module, which typically contains filters, LNAs (and possibly mixers), separately from other signal processing components. Such a function-oriented manufacturing approach could lead to increased performance and part count in monolithically integrated cellular electronics without unduly increasing the component size.

The RF front-ends 100, as shown in FIGS. 4a, 4b and 5, have been used to show how filters and LNAs can be arranged in a module for use in a multi-band mobile phone.

However, the architecture for the RF front-end is not limited to three bands. The number of bands in a mobile phone can be more or less than three. Nevertheless, the advantages arising from this versatile front-end architecture do not diminish because the number of bands in a mobile phone is different from three. Moreover, the filters in the Rx section are always bandpass filters. In the Tx section, the filters at the input side of the PAs typically are bandpass filters for filtering out noise before amplification. The filters at the output side of the PAs, in some cases, may be just lowpass filters (for example, the 900 MHz GSM Tx) for cleaning harmonics.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A radio-frequency front-end (100) for use with a radio-frequency signal processor (200) in a multi-band mobile terminal, the mobile terminal capable of operating in a plurality of frequency bands including a first frequency band and a different second frequency band, the front-end adapted to convey signals to and from the signal processor via a connection means (150), wherein the mobile terminal comprises:
    an antenna system (10);
    a first receiver ($52_2$) for receiving first signals in the first frequency band from the antenna system;
    a second receiver ($52_3$) for receiving second signals in the second frequency band from the antenna system;
    a first transmitter ($53_1$) for providing third signals in the first frequency band to the antenna system for transmission; and
    a second transmitter ($53_2$) for providing fourth signals in the second frequency band to the antenna system for transmissions, characterized in that
    the antenna system comprises:
        a first receiving antenna ($12_a$, $12_b$), operable in the first frequency band and operatively connected to the first receiver ($52_2$), for allowing the first receiver to receive the first signals;
        a second receiving antenna ($12_c$, $12_d$), operable in the second band and operatively connected to the second receiver ($52_3$), for allowing the second receiver to receive the second signals;
        a first transmitting antenna ($12_g$), operable in the first band and operatively connected to the first transmitter ($53_1$), for transmitting the third signals; and
        a second transmitting antenna ($12_h$), operable in the second band and operatively connected to the second transmitter ($53_2$), for transmitting the fourth signals, said front-end further characterized by:
            a first frequency filter ($32_2$), operatively connected to the first receiver ($52_2$) and the first receiving antenna ($12_a$, $12_b$), for frequency filtering the first signals;
            a second frequency filter ($32_3$), operatively connected to the second receiver ($52_3$) and the second receiving antenna ($12_c$, $12_d$), for frequency filtering the second signals;
            a third frequency filter ($32_4$), operatively connected to the first transmitter ($53_1$) and the first transmitting antenna, for frequency filtering the third signals; and
            a fourth frequency filter ($32_5$), operatively connected to the second transmitter ($53_2$) and the second transmitting antenna ($12_h$), for frequency filtering the fourth signals.

2. The front-end of claim 1, further characterized by
    a first down-converting element ($55_3$, $55_4$), operatively connected to the first receiver ($52_2$), for down-converting the first signals for providing down-converted first signals to the signal processor.

3. The front-end of claim 1, further characterized by
    a second down-converting element ($55_5$, $55_6$), operatively connected to the second receiver ($52_3$), for down-converting the second signals for providing down-converted second signals to the signal processor.

4. The front-end of claim 1, characterized in that
    the first and second frequency filters are bulk acoustic wave filters.

5. The front-end of claim 1, characterized in that
    the third and fourth frequency filters are bulk acoustic wave filters.

6. The front-end of claim 1, characterized in that
    the first frequency filter is a balanced filter.

7. The front-end of claim 6, characterized in that
    the second frequency filter is a balanced filter.

8. The front-end of claim 1, wherein said plurality of frequency bands further includes a third frequency band, and wherein the mobile terminal further comprises:
    a third receiver ($52_1$) for receiving fifth signals in the third frequency band from the antenna system; and
    a third transmitter ($53_3$) for providing sixth signals in the third frequency to the antenna system for transmission, said front-end further characterized in that
    the antenna system further comprises:
        a third receiving antenna ($12_e$, $12_f$), operable in the third band and operatively connected to the third receiver ($52_1$), for allowing the third receiver to receive the fifth signals; and
        a third transmitting antenna ($12_i$), operable in the third band and operatively connected the third transmitter ($53_3$), for transmitting the sixth signals, and further characterized by
            a fifth frequency filter ($32_1$), operatively connected to the third receiver ($52_1$) and the third receiving antenna ($12_e$, $12_f$), for frequency filtering the fifth signals; and
            a sixth frequency filter ($32_6$), operatively connected to the third transmitter ($53_3$) and the third receiving antenna ($12_i$), for transmitting the sixth signals.

9. The front-end of claim 8, wherein the sixth frequency filter ($32_6$) is fed by an up-converting element ($210_n$).

10. The front-end of claim 1, wherein said plurality of frequency bands further includes a third frequency band, and wherein the mobile terminal further comprises:
    a third receiver ($52_1$) for receiving fifth signals in the third frequency band from the antenna system; and
    a third transmitter ($53_3$) for providing sixth signals in the third frequency to the antenna system for transmission, said front-end further characterized in that
    the first receiving antenna ($12_a$, $12_b$) is also operable in the third frequency band, and
    the antenna system further comprises a third transmitting antenna ($12_i$), operable in the third band and operatively connector the third transmitter ($53_3$), for transmitting the sixth signals, and further characterized by a fifth frequency filter ($32_1$), operatively connected to the third receiver ($52_1$) and the first receiving antenna ($12_a$, $12_b$), for frequency filtering the fifth signals;

a sixth frequency filter ($32_6$), operatively connected to the third transmitter ($53_3$) and the third receiving antenna ($12_i$), for frequency filtering the sixth signals; and a phase shifter (14), operatively connected between the first frequency filter ($32_2$) and the fifth frequency filter ($32_1$) for matching the first and fifth frequency filters.

11. A method of improving the flexibility in use of a radio-frequency front-end (100) with a radio-frequency signal processor (200) in a multi-band mobile terminal, the mobile terminal capable of operating in a plurality of frequency bands including a first frequency band and a different second frequency band, the front-end adapted to convey signals to and from the signal processor via a connection means (150), wherein the mobile terminal comprises:

an antenna system (10);

a first receiver ($52_2$) for receiving first signals in the first frequency band, from the antenna system;

a second receiver ($52_3$) for receiving second signals in the second frequency band from the antenna system;

a first transmitter ($53_1$) for providing third signals in the first frequency band to the antenna system for transmission; and a second transmitter ($53_2$) for providing fourth signals in the second frequency band to the antenna system for transmission, said method characterized by providing in the antenna system a first receiving antenna ($12_a$, $12_b$), operable in the first frequency band and operatively connected to the first receiver ($52_2$), for allowing the first receiver to receive the first signals, and a first frequency filter ($32_2$), operatively connected to the first receiver ($52_2$) and the first receiving antenna ($12_a$, $12_b$), for frequency filtering the first signals;

providing in the antenna system a second receiving antenna ($12_c$, $12_d$), operable in the second band and operatively connected to the second receiver ($52_3$), for allowing the second receiver to receive the second signals, and a second frequency filter ($32_3$), operatively connected to the second receiver ($52_3$) and the second receiving antenna ($12_c$, $12_d$), for frequency filtering the second signals;

providing in the antenna system a first transmitting antenna ($12_g$), operable in the first band and operatively connected to the first transmitter ($53_1$), for transmitting the third signals, and a third frequency filter ($32_4$), operatively connected to the first transmitter ($53_1$) and the first transmitting antenna ($12_g$), for frequency filtering the third signals; and providing in the antenna system a second transmitting antenna ($12_h$), operable in the second band and operatively connected to the second transmitter ($53_2$), for transmitting the fourth signals, and a fourth frequency filter ($32_5$), operatively connected to the second transmitter ($53_2$) and the second transmitting antenna ($12_h$), for frequency filtering the fourth signals.

12. The method of claim 11, further characterized by providing a first down-converting element ($55_3$, $55_4$), operatively connected to the first receiver ($52_2$), for down-converting the first signals for providing down-converted first signals to the signal processor.

13. The method of claim 11, further characterized by providing a second down-converting element ($55_5$, $55_6$), operatively connected to the second receiver ($52_3$), for down-converting the second signals for providing down-converted second signals to the signal processor.

14. The method of claim 11, characterized in that the first and second frequency filters are balanced filters.

15. The method of claim 11, wherein said plurality of frequency bands further includes a third frequency band, and wherein the mobile terminal further comprises:

a third receiver ($52_1$) for receiving fifth signals in the third frequency band from the antenna system; and a third transmitter ($53_3$) for providing sixth signals in the third frequency to the antenna system for transmission, said method further characterized by providing in the antenna system a third receiving antenna ($12_e$, $12_f$), operable in the third band and operatively connected to the third receiver ($52_1$), for allowing the third receiver to receive the fifth signals, and a fifth frequency filter ($32_1$), operatively connected to the third receiver ($52_1$) and the third receiving antenna ($12_e$, $12_f$), for frequency filtering the fifth signals; and providing a third transmitting antenna ($12_i$), operable in the third band and operatively connected the third transmitter ($53_3$), for transmitting the sixth signals, and a sixth frequency filter ($32_6$), operatively connected to the third transmitter ($53_3$) and the third receiving antenna ($12_i$), for transmitting the sixth signals.

16. The method of claim 11, wherein said plurality of frequency bands further includes a third frequency band, and wherein the mobile terminal further comprises:

a third receiver ($52_1$) for receiving fifth signals in the third frequency band from the antenna system;

a third transmitter ($53_3$) for providing sixth signals in the third frequency to the antenna system for transmission, said method further characterized in that the first receiving antenna ($12_a$, $12_b$) is also operable in the third frequency band, and the antenna system further comprises a third transmitting antenna ($12_i$), operable in the third band and operatively connector the third transmitter ($53_3$), for transmitting the sixth signals, said method further characterized by providing in the antenna system:

a fifth frequency filter ($32_1$), operatively connected to the third receiver ($52_1$) and the first receiving antenna ($12_a$, $12_b$), for frequency filtering the fifth signals;

a sixth frequency filter ($32_6$), operatively connected to the third transmitter ($53_3$) and the third receiving antenna ($12_i$), for frequency filtering the sixth signals; and a phase shifter (14), operatively connected between the first frequency filter ($32_2$) and the fifth frequency filter ($32_1$) for matching the first and fifth frequency filters.

* * * * *

UNITED STATES PATENT AND TRADEMARK OFFICE
CERTIFICATE OF CORRECTION

PATENT NO. : 6,751,470 B1
DATED : June 15, 2004
INVENTOR(S) : Ellä et al.

It is certified that error appears in the above-identified patent and that said Letters Patent is hereby corrected as shown below:

<u>Title page, Item [54], and Column 1, lines 1-2,</u>
Title, should read -- VERSATILE RF FRONT-END FOR MULTIBAND MOBILE TERMINALS --, not "VERSATILE RF FRONT-END MULTIBAND MOBILE TERMINALS --.

<u>Column 4,</u>
Line 14, "connector" should be -- connected to --.

<u>Column 10,</u>
Line 65, "connector" should be -- connected to --.

<u>Column 12,</u>
Line 30, "connected" should be -- connected to --.
Line 48, "connector" should be -- connected to --.

Signed and Sealed this

Twelfth Day of October, 2004

JON W. DUDAS
*Director of the United States Patent and Trademark Office*